United States Patent
Goodman (10) Patent No.: US 6,229,898 B1
(45) Date of Patent: May 8, 2001

(54) ACTIVE VIBRATION CONTROL SYSTEM USING ON-LINE SYSTEM IDENTIFICATION WITH ENHANCED NOISE REDUCTION

(75) Inventor: Robert K. Goodman, West Hartford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/219,817

(22) Filed: Dec. 23, 1998

(51) Int. Cl.[7] ............................ A61F 11/06; G10K 11/16; H03B 29/00

(52) U.S. Cl. ................. 381/71.4; 381/71.11; 381/71.12; 702/190; 244/17.13

(58) Field of Search ................................ 381/71.4, 71.1, 381/71.3, 71.9, 71.11, 71.12, 71.13, FOR 123, 86, 94.1, FOR 12, 94.3, 94.2; 702/189, 190, 191, 196; 708/300, 322; 415/119

(56) References Cited

U.S. PATENT DOCUMENTS

| | | | |
|---|---|---|---|
| 4,025,721 | 5/1977 | Graupe et al. ........................... 179/1 |
| 4,483,425 | 11/1984 | Newman ............................... 188/378 |
| 4,511,219 | 4/1985 | Giles et al. ........................... 350/388 |
| 4,677,668 | 6/1987 | Ardalan et al. ....................... 379/411 |
| 4,679,136 | 7/1987 | Shigemasa ........................... 364/150 |
| 4,760,596 | 7/1988 | Agrawal et al. ....................... 379/410 |
| 4,819,182 | 4/1989 | King et al. ............................ 364/508 |
| 4,823,299 | 4/1989 | Change et al. ....................... 364/735 |
| 4,953,098 | 8/1990 | Fischer, Jr. et al. .................. 364/508 |
| 4,954,975 | 9/1990 | Kalata .................................. 364/567 |
| 5,062,123 | 10/1991 | Geile et al. ............................ 375/81 |
| 5,105,372 | 4/1992 | Provost et al. ................... 364/551.01 |
| 5,115,391 | 5/1992 | Puthenpura et al. ................. 364/152 |
| 5,219,143 | 6/1993 | Staple et al. ......................... 248/550 |
| 5,239,468 | 8/1993 | Sewersky et al. ............... 364/424.03 |
| 5,242,130 | 9/1993 | Mouille .............................. 244/17.13 |
| 5,251,863 | 10/1993 | Gossman et al. .................... 248/550 |
| 5,269,489 | 12/1993 | West et al. ........................... 248/550 |
| 5,293,425 | * 3/1994 | Oppenheim et al. ............. 381/71.11 |
| 5,310,137 | 5/1994 | Yoerkie et al. .................... 244/17.27 |
| 5,313,407 | 5/1994 | Tiernan et al. ....................... 364/508 |
| 5,323,335 | 6/1994 | Mitchell ............................... 364/572 |
| 5,332,072 | 7/1994 | Crannage ............................. 188/378 |
| 5,335,164 | 8/1994 | Gough, Jr. et al. .................. 364/149 |
| 5,341,307 | 8/1994 | Myhre et al. ......................... 364/479 |
| 5,347,884 | 9/1994 | Garnjost et al. ....................... 74/573 |
| 5,383,133 | 1/1995 | Staple ................................. 364/508 |
| 5,390,543 | 2/1995 | Staple et al. ........................... 73/583 |
| 5,416,712 | 5/1995 | Geier et al. .......................... 364/450 |
| 5,473,698 | * 12/1995 | Garnjost et al. ................... 381/71.4 |
| 5,519,637 | 5/1996 | Mathur ................................ 364/574 |
| 5,526,292 | 6/1996 | Hodgson et al. .................... 364/574 |

(List continued on next page.)

OTHER PUBLICATIONS

*Refinement and Evaluation of Helicopter Read–Time Self–Adaptive Active Vibration Controller Algorithms*, NASA Contractor Report 3821, by Mark W. Davis, Contract NAS2–11260, Aug. 1984, pp. 1–30.

*Primary Examiner*—Xu Mei
(74) *Attorney, Agent, or Firm*—Fitzpatrick, Cella, Harper & Scinto (57) ABSTRACT

A system for enhancing vibration reduction in a vehicle that utilizes one or more sensors which sense ambient vibration in the vehicle and generate a signal corresponding to the sensed vibrations. A control circuit is coupled to the sensors and receives the signals. The control circuit, utilizing Kalman filtering algorithms, generates a control signal that adapts a previous command force, from an actuator to a sensor, thereby dynamically updating a parameter that represents an estimated vehicle response. This dynamically updated parameter is a result of utilizing a covariance that is a function of an empirically derived constant value and a change in forces exerted by the actuator. The control circuit outputs this control signal to vibration generator units, which generate a vibration field for reducing vibrations in the vehicle.

9 Claims, 6 Drawing Sheets

U.S. PATENT DOCUMENTS

| | | | |
|---|---|---|---|
| 5,621,656 | 4/1997 | Langley | 52/167.2 |
| 5,627,768 * | 5/1997 | Uhlmann et al. | 702/189 |
| 5,666,770 | 9/1997 | Sato et al. | 52/167.2 |
| 5,672,872 | 9/1997 | Wu et al. | 250/330 |
| 5,687,077 | 11/1997 | Gough, Jr. | 364/149 |
| 5,694,474 | 12/1997 | Ngo et al. | 381/66 |
| 5,740,048 | 4/1998 | Abel et al. | 364/443 |
| 5,812,682 * | 9/1998 | Ross et al. | 381/71.11 |
| 5,867,411 * | 2/1999 | Kumar | 708/300 |
| 6,067,853 * | 5/2000 | Thevenot | 73/178 H |

* cited by examiner

ACTIVE VIBRATION CONTROL SYSTEM USING ON-LINE SYSTEM IDENTIFICATION WITH ENHANCED NOISE REDUCTION

BACKGROUND OF THE INVENTION

1. Field of the Invention

This invention relates generally to an active control system to reduce ambient vibrations. More particularly, this invention relates to producing a control signal, which reflects adjustments to estimated vehicle structural dynamics, using signal filtering. The control signal is transmitted to one or more vibration generators for reducing ambient vibrations in a vehicle.

2. Brief Description of the Art

Vibrations can reach undesired levels in the interior of a vehicle, such as a helicopter or an airplane resulting in an unpleasant environment in the vehicle. This is particularly true for helicopters, which vibrate in response to loads generated by the rotor blades as they support and propel the aircraft through the air. In the past, helicopter manufacturers have employed a variety of vibration control approaches using principles of mechanical isolation and absorption to render the aircraft ride acceptable with respect to comfort. These approaches, which may be designated as "passive", attack vibration by modifying the inherent structural dynamics of the aircraft, "de-tuning" its response to prevalent frequencies in the disturbing load signature. An alternate approach employs powered actuators, which apply vibratory loads to the structure in such a way as to produce a vibration field which nullifies the ambient vibration. In the arena of vibration control this type of approach is designated as "active" in the sense that an actuator is commanded to actively generate the nullifying vibration field.

A key component to the successful implementation of an active vibration control system is the proper determination of commands to the actuators. When the relationship between actuator forces and the vibratory response to those forces is known a priori, the proper selection of commands to the actuators can employ a "deterministic" control algorithm. Oftentimes, however, the relationship between actuator forces and vibratory response is either not known a priori, or varies as the structural dynamics are affected by fuel burn-off, cargo re-distribution, or in the case of helicopters, due to changes in the frequency of rotor loading as rotor speed changes during maneuvers. In such cases, "on-line system identification" may be employed to use information acquired during the course of making control changes to establish and/or modify an estimate of the relationship between actuator forces and vibratory response. This estimate is then used during subsequent control iterations to reduce vibration.

A typical environment of a control system in which the present invention is suitably employed is that of a minimum variance controller such as that described in NASA Contractor Report 3821, "Refinement and Evaluation of Helicopter Real-Time Self-Adaptive Active Vibration Controller Algorithms" on pages 1–30. NASA Contractor Report 3821 is hereby incorporated by reference in its entirety herein. The controller uses the approximation that there is a quasi-static linear relationship between actuator commands and system response, which may be expressed by the transfer matrix relationship:

$$Z_i = \tau(U_i - U_{i-1}) + Z_{i-1} + V + E,$$

where:

$Z_i$ is the n dimensional measured vibration response at time i;

$Z_{i-1}$ is the n dimensional state vector of vibration response at time i−1;

$U_i$ is the m dimensional command to actuators at time i;

$U_{i-1}$ is the m dimensional command to actuators at time i−1;

V is the n dimensional change in measured vibration due to change in external disturbances;

E is the change in measured vibration due to change in measurement noise; and $\tau$ is the current estimate of the n by m dimensional transfer matrix.

The minimum variance controller is obtained by minimization of the performance criteria:

$$J = E\{(Z_i - Z_{opt})^T W_z (Z - Z_{opt}) + U_i^T W_U U_i + \Delta U_i^T W_{\Delta U} \Delta U_i\}$$

where:

J=the performance index (a scalar);

E=expected value;

$Z_{opt}$=the vector of desired vibration at sensor locations (typically zeroes);

Z=the vector of measured vibration at sensor locations;

$W_Z$=diagonal weighting matrix on output (vibration) parameters;

U=command input to actuators;

$W_U$=diagonal weighting matrix that constrains the amplitude of actuator commands;

$\Delta U$=change in command input to actuators;

$W_{\Delta U}$=is a diagonal weighting matrix that constrains the rate of change in command inputs;

T=vector or matrix transpose; and i=a counter of discrete time increments.

Since performance index J includes measured output parameters and control inputs, each output parameter and control input can be individually weighed to make it more or less important than the other elements.

Using a deterministic controller in a local model, the optimal change in command input to the actuator, $\Delta U$, for the ith rotor revolution is as follows:

$$\Delta U_i = -D[W_U U_{i-1} + \tau^T W_z (Z_{i-1} - Z_{opt})]$$

where:

$\Delta U_i$=the optimal control input required to minimize the performance index; and $D = (\tau^T W_z \tau + W_U + W_{\Delta U})^{-1}$.

The other variables are the same as described above.

When J is minimized, the solution to optimal controller provides information for determining the next control step. For improved control performance an accurate estimate of the matrix $\tau$ is essential. In a real time application, it is helpful to employ a Kalman filter to track the elements of $\tau$. Previous attempts to accurately track the values $\tau$ because the Kalman filter has been unable to adequately suppress the corrupting influence of system and measurement noise. For example, U.S. Pat. No. 4,819,182 issued to King discloses a method and apparatus for reducing vibration of a helicopter fuselage using a plurality of actuators, which are oscillated at a frequency corresponding to the exciting frequency. A plurality of accelerometers generate signals representing dynamic acceleration. The actuators are controlled by a processor. This patent does not disclose modifying a covariance value as a means for estimating system dynamics. U.S. Pat. No. 4,819,182 is hereby incorporated by reference in its entirety herein.

In many applications, the implementation of the Kalman filter algorithm assumes that measurement noise and system noise are independent from one another, have a Gaussian distribution, and have zero mean. When these assumptions are valid, a standard Kalman filter approach can be effective in reducing the corrupting influence of noise on the estimation of the relationship between actuator forces and vibration. When these assumptions are not valid, standard approaches are ineffective, resulting in poor estimation, and consequently decreased performance of the control system using the estimate for control decisions. The object of the present invention is to address the shortcomings of the standard Kalman filter approach in this regard.

BRIEF SUMMARY OF THE INVENTION

An object of the present invention is to provide a control system that utilizes dynamically validated and updated data to generate a control signal that is used for ambient vibration reduction. Accordingly, one embodiment of the instant invention is drawn to a system having at least one sensor, mounted in a vehicle, for generating successive first and second ambient vibration signals. These ambient vibration signals correspond to a first and second sensed condition. One or more actuators are mounted on the vehicle, for generating a vibration-reducing actuator force that is applied to the vehicle. A data module is coupled to the sensor and the actuator for storing data. This data correlates at least one actuator force with at least one sensor response to the force, and outputs the stored data. A control circuit, including a Kalman filter, receives the first and second ambient vibration signals in succession from the sensor and receives output data from the data module. The control circuit generates a first control signal to an associated actuator corresponding to the first ambient vibration signal. The control circuit utilizes Kalman filtering and a covariance that is a function of an actuator force to modify data in the data module. The control circuit outputs the second control signal, which is a function of the second ambient vibration signal and the modified data of the data module.

A second embodiment of the instant invention is drawn to a system for reducing noise in a vehicle. The system includes sensing ambient vibration in the vehicle. An ambient vibration signal is generated that corresponds to sensed ambient vibration. The ambient vibration signal is processed to produce a control signal. The control signal is a function of a dynamic covariance corresponding to a constant value divided by a change in actuator force raised to an integer power. The control signal is output to an actuator, which generates a vibration field for ambient vibration reduction. The actuator force is a function of the control signal transmitted from the control circuit.

BRIEF DESCRIPTION OF THE DRAWINGS

A more complete understanding of the instant invention and the attendant features and advantages thereof may be had by reference to the following detailed description of the invention when considered in conjunction with the accompanying drawings wherein.

DETAILED DESCRIPTION OF THE INVENTION

The instant invention provides on-line system identification for enhanced vibration reduction by generating a control signal that is used to operate a vibration generator to reduce vibrations in a vehicle. The control signal is produced by a control circuit which employs an estimate of the vehicle structural dynamics as a basis for calculating optimal actuator commands. The estimate of the vehicle structural dynamics is determined through a modified Kalman filter approach which uses response information gathered during the application of actuator commands in preceding control steps. The modified Kalman filter approach is capable of more accurately estimating actual vehicle structural dynamics in the presence of noise than a standard Kalman filter approach. As a result of improved estimation, the control circuit is more effective in reducing vibration.

Figure 1:
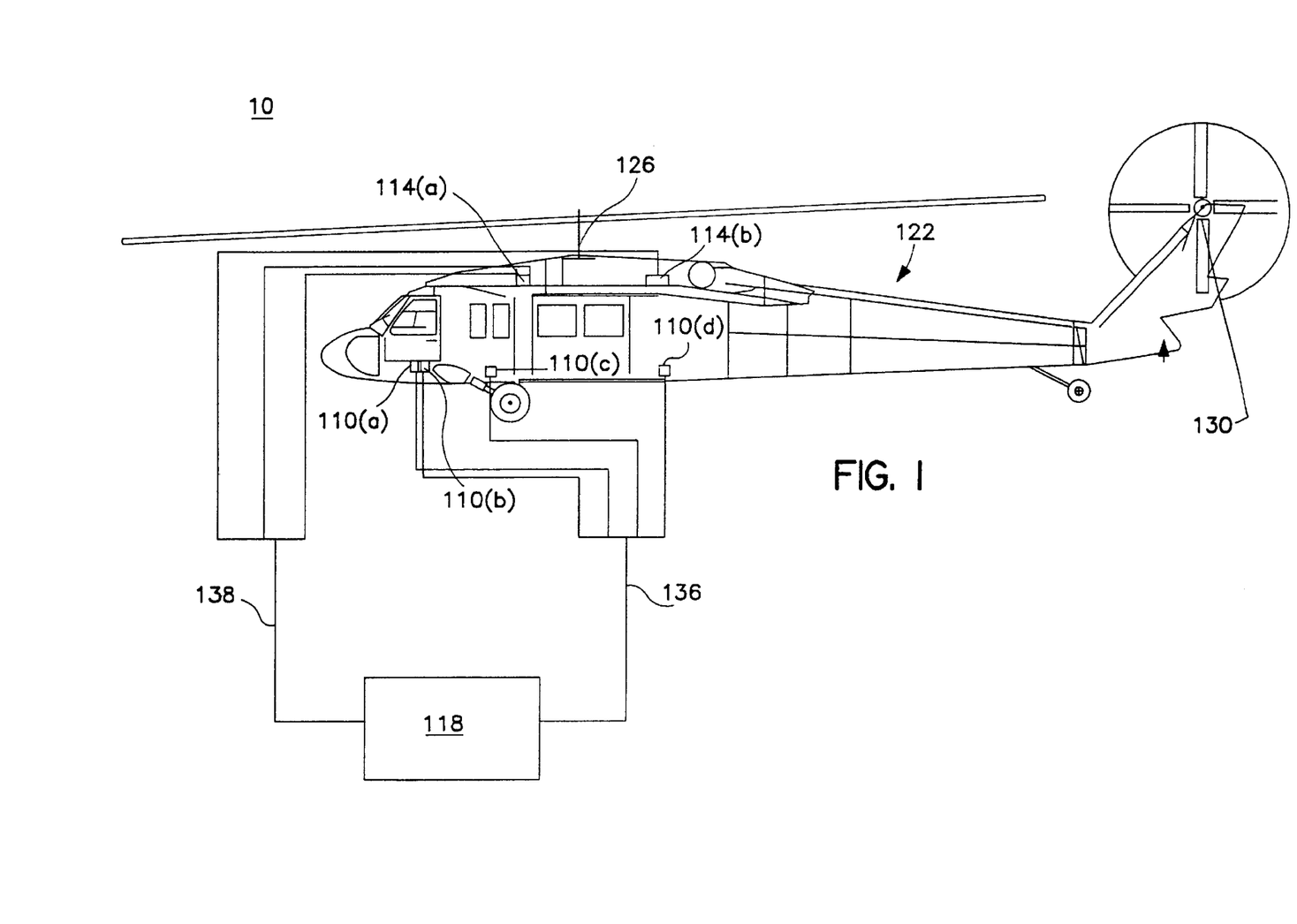
FIG. 1 shows a helicopter environment for the instant invention.

Referring now to the drawings, where like reference numerals identify corresponding or similar elements throughout the several views, FIG. 1 shows the improved vibration reduction system 10 utilized in a vehicle 122. Vehicle 122 includes sensors 110($a$)–($d$) that sense vibrations and transmit a signal representing the sensed vibration to a controller 118. The controller 118 processes the received vibration signals and generates a control command signal to actuators 114($a$) and ($b$). Actuators 114 respond to the control command by generating a compensating force to reduce sensed vibrations in the vehicle 122.

Vehicle 122 is depicted as a helicopter in FIG. 1 but is also suitably a fixed wing aircraft, or a flight simulator apparatus or any apparatus that produces sensed ambient vibrations from a vibration source. The vehicle 122 includes one or more sensors 110 mounted on the vehicle 122. For illustrative purposes, sensors 110 are shown as 110$a$–$d$, which are four sensors, however, any number of sensors suitable with the design of the vehicle 122 would be acceptable. The number and location of sensors 110 is a design choice and is not critical to understanding the invention. FIG. 1 shows the sensors 110($a$) and ($b$) mounted in the cockpit of the vehicle 122. Sensor 110($c$) is located in the fore cabin and sensor 110($d$) is located in the aft cabin of vehicle 122. Sensors 110 sense ambient vibrations in the vehicle 122. The ambient vibrations, sensed by the sensors 110, are produced by vibratory loads. Examples of vibratory loads include vibrations originating in rotor 126 and/or vibrations produced from stabilator 130. Additionally, exterior forces such as; turbulence, down wash, wind gusts, and other vibration generating events will cause undesired ambient vibrations in vehicle 122.

Sensors 110 sense this vibrational data and transmit corresponding ambient vibrational signals to a control circuit (also referred to as a controller) 118. The control circuit 118 processes the received ambient vibrational signals from the sensors 110 via interconnector 136. Interconnector 136 is suitably any apparatus that is capable of transmitting a signal from sensors 110(a)–(d) to control circuit 118. Typically, interconnector 136 is a wire or infrared signal transmission means.

Control circuit 118 includes memory, and processing capabilities, and is typically a processor such as a digital signal processor (DSP), a microprocessor or an 80486 processor. Those skilled in the art will appreciate that virtually any processor with adequate memory and speed could be used for the processing performed by control circuit 118. The control circuit 118 executes software, or is preprogrammed; to filter the received sensed ambient vibrational signals from sensors 110. Specifically, the control circuit 118 utilizes Kalman filtering capabilities and software, or hardware to produce a covariance value that validates, updates, and utilizes data in the system 10. Control circuit 118 embodies any control scheme which seeks to minimize some mathematical function of the states and inputs of the system; these systems are known as "optimal control systems" to those skilled in the art. The control circuit 118 generates one or more control signals (referred to as a single control signal for descriptive purposes) that are transmitted to vibration generator units 114, which are shown as 114(a) and, (b). This control signal is the result of a validation procedure that determines the validity of a received sensed ambient vibration signal from the sensors 110.

Vibration generator units (referred to as generation units or actuators herein) 114 are suitably coupled to the control circuit 118 via interconnector 138 to receive control one or more signals from the control circuit 118. Interconnector 138 is suitably a wire, infra-red transmission means as known to those in the art, or any means of transmitting a control signal from control circuit 118 to vibration generator units 114. FIG. 1 shows vibration generators 114(a) and (b); however, any number of generator units suited to the design of the vehicle 122 could be used. FIG. 1 shows two generator units 114(a) and (b) merely for illustrative purposes and the quantity and location of generator units 114 is a design choice and is not critical to understanding the invention. The generator units 114 are suitably actuators or any apparatus capable of generating a vibration field. Generator units 114 are typically mounted in a location in proximity to the main rotor 126 in the case in which the vehicle is a helicopter, or any suitable location in another type of vehicle. The generator units 114(a) and (b) are mounted on the vehicle 122 to effectively generate a vibration-reducing field. This vibration-reducing field is used to offset vibrations generated from the vibratory load sources mentioned previously that adversely affect the vehicle dynamics of vehicle 122.

Figure 2:
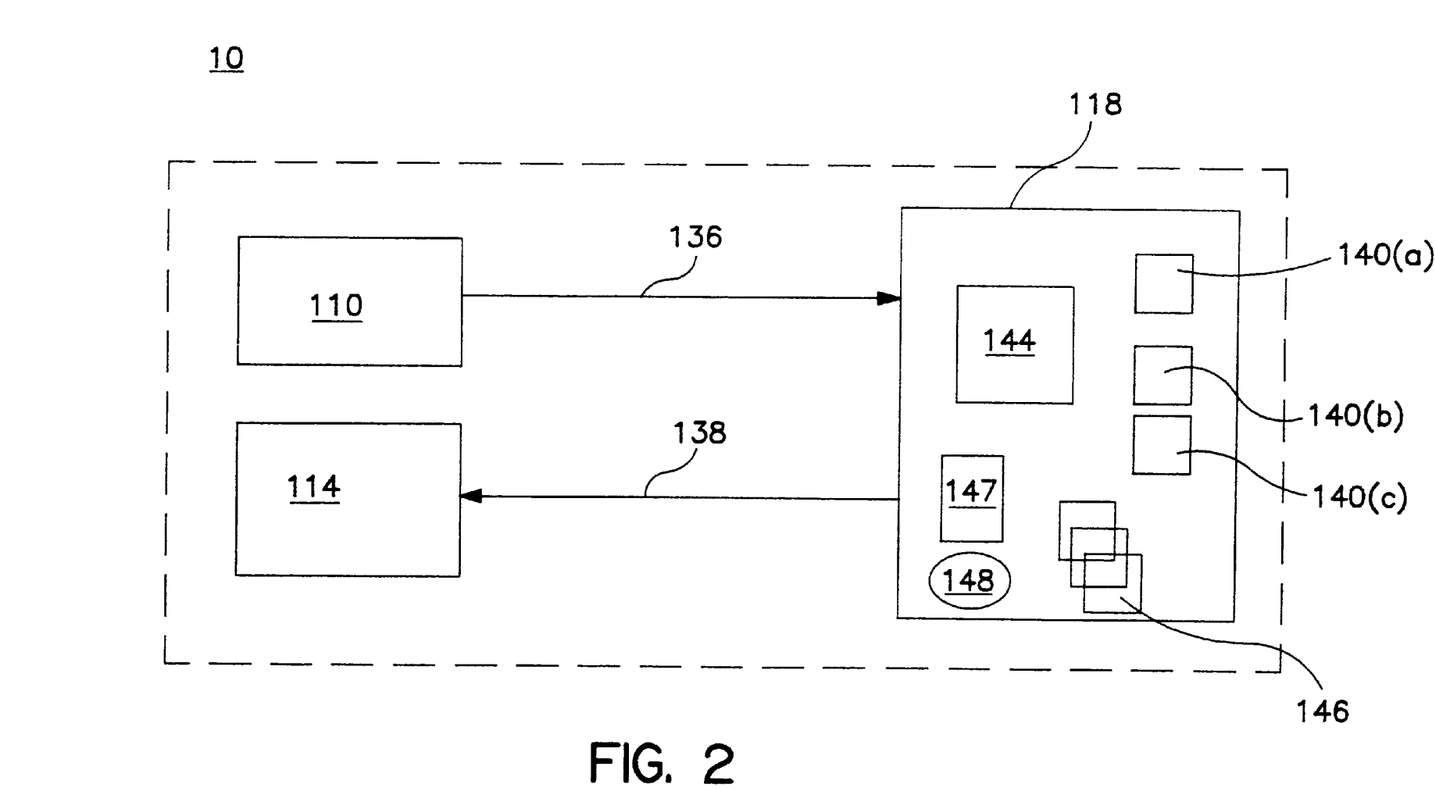
FIG. 2 is a block diagram of components of the instant invention.

FIG. 2 shows a block diagram of the system 10, including control circuit 118 coupled to sensor unit 110 and vibration generator unit 114. Sensor unit 110 generates a vibration signal corresponding to sensed ambient vibration in the environment, typically the interior of a vehicle. This signal is transmitted to a control circuit 118 via interconnector 136. The control circuit 118 suitably comprises a combination of processors shown as 148, one or more monitor units 144, such as CRTs, memory 146 for storing a plurality of modules, which are typically data structures, and one or more vehicle dynamic data matrices 147. The control circuit 118 has one or more Kalman filters 140(a) . . . (i). The control circuit 118 includes algorithms and software or hardware commands to invert the vibrational signal that is received from sensor 110 and otherwise process the received signal to generate an inverted vibration signal that will command the vibration generator units 114 to generate a vibration-reducing field. The processing commands for control unit 118 are suitably stored in memory 146 in the control circuit 118 or downloaded to control circuit 118 as software. The memory 146 also stores information related to vehicle dynamics. This information is typically stored as a data matrix 147 that includes data which represents estimates of a vehicle response based on a previous vibration generator force. Alternatively, the contents of this data matrix could be stored in memory remotely located from the control circuit 118. The control circuit 118 includes one or more Kalman filters 140(a) . . . (i) (i is any number that complies with the design of the system but the plurality of Kalman filters 140(a) . . . (i) will be referred to as a single Kalman filter 140 in the specification).

The Kalman filter 140 updates the state estimation based on prior state estimates and inputs of observed and/or measured system variables. The system variables are measured in real-time so that the system variable data can be directly input to the Kalman filter 140, or alternatively, the data may be stored for a period of time before being input to the Kalman filter 140.

A controller algorithm, which is suitable stored or preprogrammed into control circuit 118, is the scheme by which the signals received from the sensors 110 are processed to generate appropriate control signals that are transmitted to the vibration generator units 114, via interconnector 138.

The measurements of ambient vibration by the sensors 110, at a given moment, may be assembled into a vector of dimension n×1 designated as Z. The forces exerted by the vibration generators (actuators) 114 may likewise be assembled in a vector of dimension m×1, designated U. The relationship between a change in actuator force (ΔU) and the resulting change in sensor measurements (ΔZ) may be expressed as the matrix equation ΔZ=τΔU, where τ is a data matrix 147 of dimension n×m (The values stored in data matrix τ 147 are suitably used in the equations previously discussed.) The values of the elements of data matrix τ 147 are determined by the physical characteristics i.e. vehicle dynamics of the structure and are suitably stored in matrix 147, which although shown in control circuit 118, could suitably be remotely located and in communication with control circuit 118. Examples of parameters in the data matrix τ are as follows: $\tau_{11}$ is the change in response at sensor number 1 due to unit change in force command at actuator number 1, $\tau_{12}$ is the change in response at sensor number 1 due to a unit change in force command at actuator number 2, and the like.

Typically, the magnitudes of ΔU and ΔZ represent a scaled quantity that is the result of manipulating an actual quantity to produce a function of that quantity (for example, electrical signal amplification and attenuation or signal processing). Many algorithms may be used for making control decisions based on this model. One example of such an algorithm that seeks to minimize the scalar performance index is as follows:

$$J_{cost} = Z^T W_z Z + U^T W_u U + \Delta U^T W_{\Delta u} \Delta U$$

where:

$W_z$ is a diagonal weighting matrix of sensor measurements;

$W_u$ is a diagonal weighting matrix that constrains control inputs;

$W_{\Delta u}$ is a diagonal weighting matrix which constrains rate of change of control inputs;

ΔU=change in actuator force;

U=actuator command force;

Z=ambient vibration signal; and

T designates the transpose of a vector or matrix.

Using the above objective in the context of a discrete time control application, the control algorithm for $i^{th}$ step takes the form:

$$\Delta U_i = -(\tau^T W_z \tau + W_u + W_{\Delta u})^{-1}[W_u U_{i-1} + \tau^T W_z(z_{i-1})]$$

where (−1) indicates a matrix inversion; and

τ=the previously described transfer matrix relating changes in sensor response to changes in actuator commands.

An essential element in the performance of this control algorithm is the accurate identification of elements stored data matrix τ 147, that is, determining the values of τ which properly characterize the structural dynamics of the vehicle. One way of performing this identification prior to operating the control circuit 118 is to simply command actuator forces from each actuator 114, one at a time, while measuring the response at each sensor 110. In conventional ambient vibration reduction systems difficulty is introduced, however, when elements of data matrix τ 147 are non-constant, i.e., when the elements of τ change during operation. In the case of an active vibration control system on a vehicle such as a helicopter, many factors give rise to non-constant elements of data matrix τ 147. For example, if rotor speed varies, resulting in changed vibration frequency, the sensitivity of response at sensors 110 due to actuator forces changes due to changes in the relationships between excitation frequency and the helicopter fuselage natural frequencies. Some other factors that may produce change in elements of data matrix τ 147 are changes in mass distribution in the fuselage resulting from passenger movement or fuel burn-off, which affect the structural dynamics of the helicopter.

When the values of elements in data matrix τ 147, which are used in the control circuit 118, do not accurately reflect the properties of the vehicle, control circuit 118 performance can be greatly degraded, to the point in some cases of instability. In order to more accurately determine the values of τ, which are the elements in the data matrix τ 147 a Kalman filter can be used in the form:

$$\tau_i = [\tau^T_{i-1} + K_i(\Delta Z_i^T - \Delta U_i^T \tau^T_{i-1})]^T$$

where $K_i$ is the Kalman gain matrix;

$K_i = P_i \Delta U_i R_i^{-1}$;

$M_i = P_{i-1} + Q_{i-1}$;

$P_i = M_i - M_i \Delta U_i (\Delta U_i^T M_i \Delta U_i + M_i)^{-1} \Delta U_i^T M_i$;

ΔU=change in actuator force;

ΔZ=change in sensor signal;

T=transpose of a matrix;

R=covariance of vibration measurement noise; and

Q=covariance of system noise, that is, covariance of fluctuations in vibration due to variation in operating environment or variations in system structural dynamics.

The Kalman filter lets the estimate of τ reflect changes in the structural dynamics of the vehicle while filtering out the effects of measurement and system noise.

In the Kalman filter derivation, the quantities (R) and (Q) are the covariance of the measurement signal noise and the covariance of the forcing vector responsible for changes in state, respectively. In the case where the Kalman filter is being used to identify the matrix τ, it is important to recognize that the meaning of "measurement noise signal" must be interpreted more generally, i.e. as τ-matrix noise. Since each τ-matrix element is effectively a ratio of change in sensor response to change in actuator command, then the "measurement noise" is a function of the change in actuator command.

Figure 3:
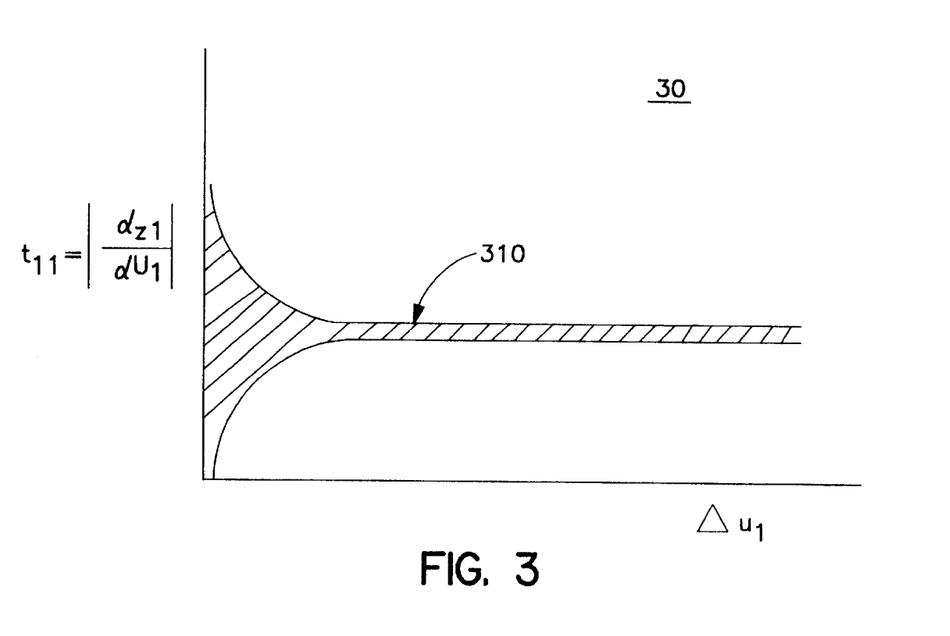
FIG. 3 is a graph showing the relationship of a τ matrix element as a function of a change in actuator command levels.

FIG. 3 shows the dependency of τ matrix noise on change in actuator command by showing the variability of a measured τ matrix element, $t_{11}$, as a function of change in actuator command. Recall that $\tau_{11} = \Delta Z_{11}/\Delta U_{11}$, i.e. that $t_{11}$ is the ratio of change in measured response a sensor 1 due to a change in command at actuator 1. A series of experiments in which a range of commands to an actuator were applied to the system and for each change in actuator command a resulting change in response was measured. FIG. 3 shows the results of plotting the ratio of the change in response to the change in command (i.e. τ matrix element) on the y-axis versus the change in command on the x-axis for a large number of samples. The cross-hatched area 310 shows the range of values. Note that for small values of ΔU, there is a much broader range of τ matrix values than for large values of ΔU (i.e. the τ matrix noise increases as ΔU decreases). This relationship exists even though the noise associated with the measurement of Z is independent of U.

FIG. 3 shows that in order to control noise, it is necessary to define covariance values (R) and (Q). In many systems employing the Kalman filter, (R) and (Q) are taken to be constant. In using a controller in which a local model is used, that is, when system "inputs" are changes in actuator force, rather than absolute actuator force, it is more appropriate to view the quantities (R) and (Q) as functions of change in actuator commands. If properly expressed, information gathered when the system is subjected to large magnitude commands is weighed more heavily in estimating τ than information gathered when changes in commands are small in magnitude.

In order to more accurately define elements of data matrix τ, the covariance (R) in the Kalman filter algorithm is defined as follows:

$$R = (K_{var}/|\Delta U_i|)^N$$

where $K_{var}$ is an empirically derived constant, the value of which is close to the value of ΔU that produces a change in response that is higher than the noise present in the system. The value of $K_{var}$ is used as a weighing constant. The quantity $|\Delta U_i|$ is the magnitude of the change in the control vector, i.e. $|\Delta U_i| = \text{SQRT}(\Sigma \Delta U_i^2)$. N is an integer which can be any value, but is typically a real number greater than 1 and is established through testing. The effect of utilizing (R) as described above in the Kalman filter algorithm is that modification of an element of data matrix τ is a function of the change in actuator force $\Delta U_i$.

Specifically, using (R) of the form described above results in emphasizing information gathered during large changes in actuator commands, and de-emphasizing information gathered during small changes for the purpose of estimating τ. By doing so, the corrupting influence of noise on the τ matrix estimation is greatly reduced.

Figure 4:
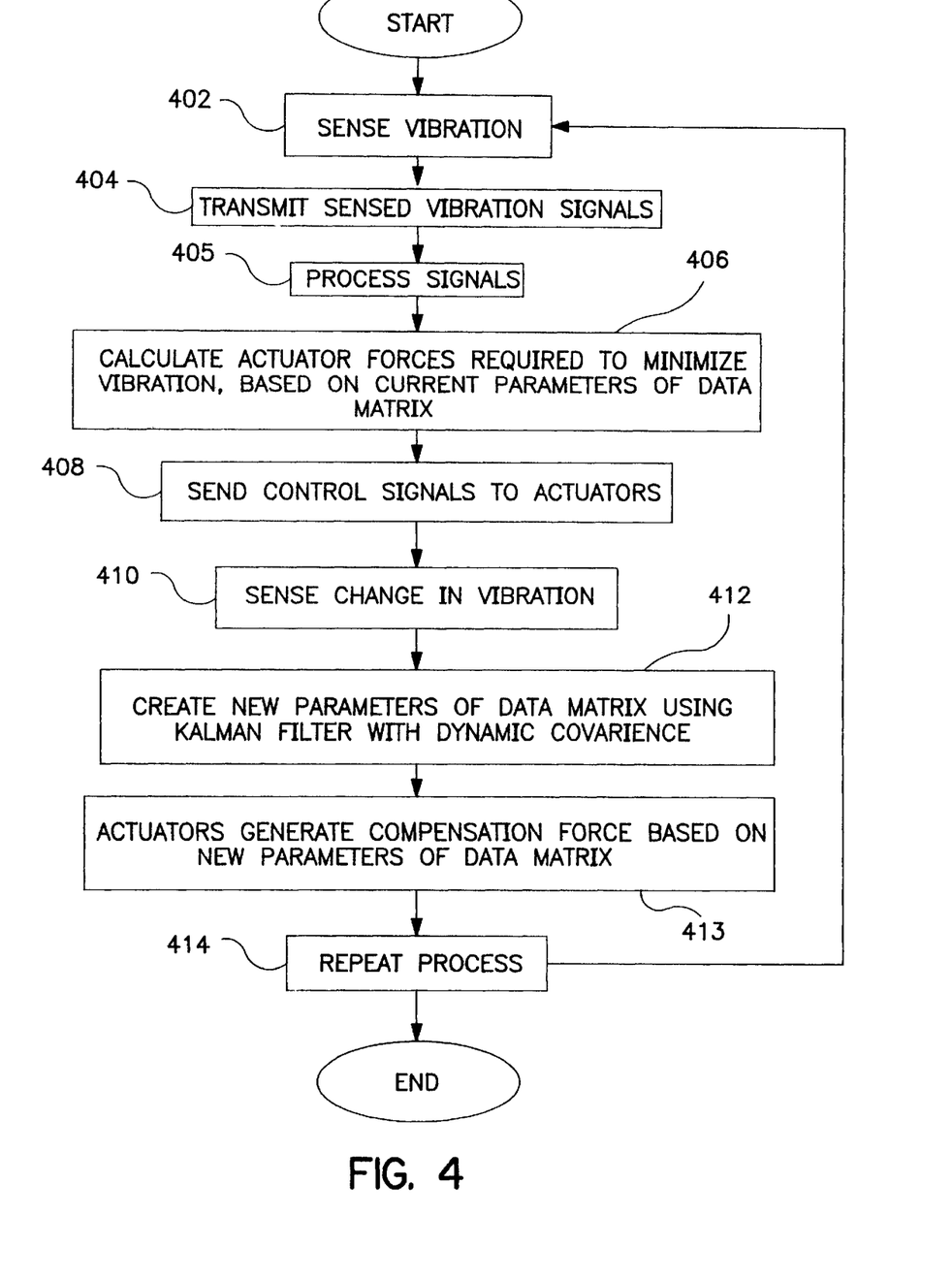
FIG. 4 is a flow chart showing the generation of a control signal that includes a dynamically validated and updated parameter.

FIG. 4 shows a flowchart of steps to generate the control signal produced by the control circuit. The control signal includes actuator force data and data from a data matrix τ that is iteratively updated based on previous or apriori information stored in the control circuit. The process begins by sensing vibrations, and generating a sensed vibration signal, as shown in step 402. This sensed vibration signal is transmitted to the control circuit, as shown in step 404. Step 405 shows that the sensed vibration signals are processed. In step 406, actuator forces are calculated to minimize vibration sensed in the vehicle. This calculation is based on the current values in the data matrix τ. In step 408, the signals to generate actuator forces that were calculated in step 406 are transmitted to the actuators. The actuators generate a vibration force that is intended to drive the sensed vibration of the vehicle to a null, or near zero value. As shown in step 410, the ambient vibration is sensed, for example, by sensors as described previously. The sensors transmit the sensed ambient vibrational signal to the control circuit. In step 412, the control circuit receives the ambient vibration signal and utilizes the input to calculate an updated estimate in the data matrix τ. This updating process utilizes Kalman filtering and a covariance value (R). Covariance (R) has an adaptive feature which utilizes input data from the last compensation force that was exerted on the vehicle and determines the validity of that force based on the magnitude of the force and the noise level. Using this covariance (R) it is possible to calculate a new estimate for the data matrix τ and thus a second control signal to activate a second actuator force (i.e. vibration generators generate a vibration in response to the second control signal). Typically this control signal data is stored in a matrix format. Once a control signal is generated by the control circuit, the control circuit transmits a control signal based on the command matrix to the actuators. The actuators receive the transmitted control signal and generate a compensation force to offset sensed vibration and thus, reduce ambient noise in the vehicle as shown in step 413. The process repeats itself as long as the system is operated as shown in step 414.

Figure 5:
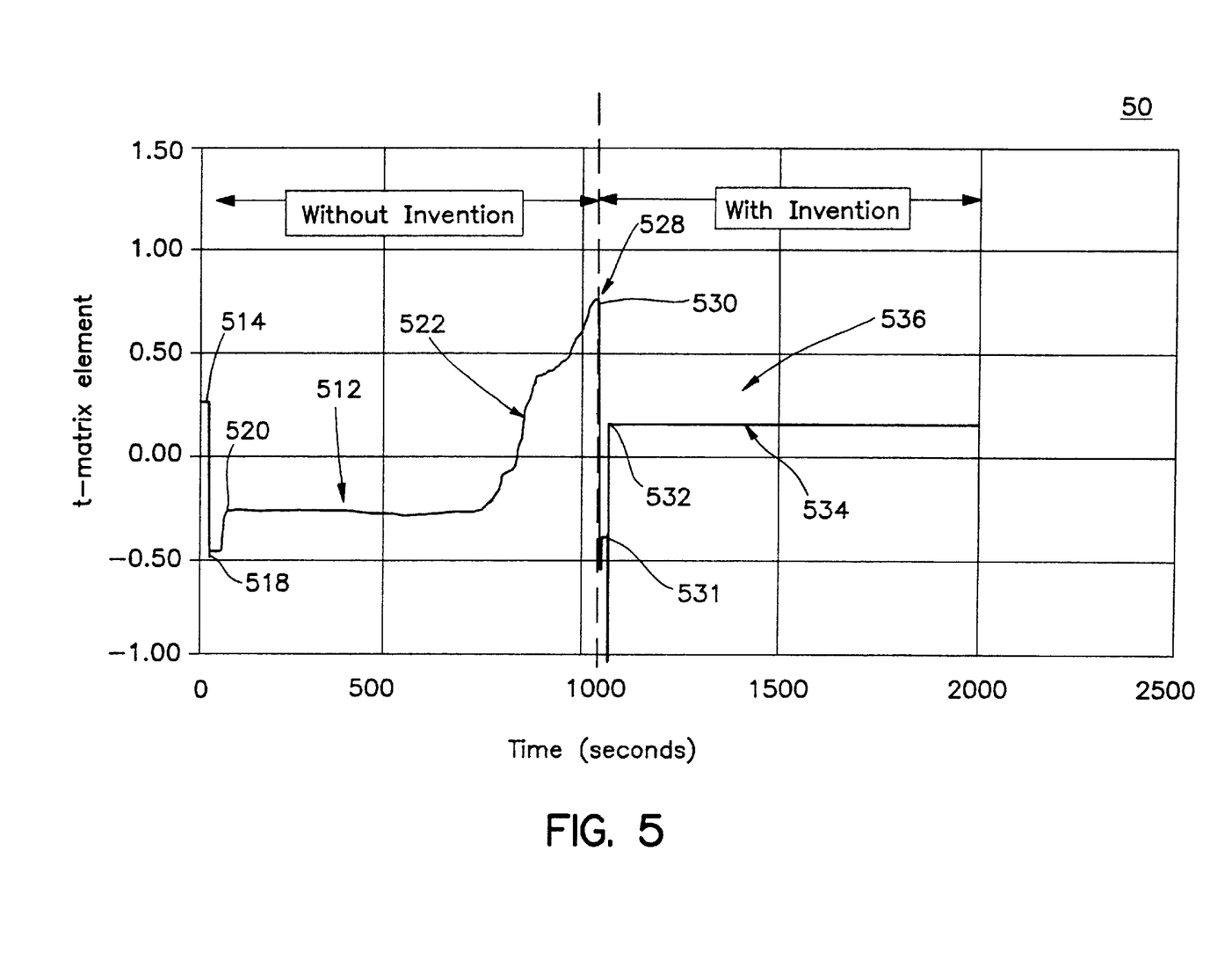
FIG. 5 is a graphical representation of a vehicle dynamic data matrix element of the instant invention.

FIG. 5 shows a graph 50 of test data of a typical data matrix element τ as identified by Kalman filter data. The magnitude of τ matrix element was plotted on the Y-axis and time was plotted on the X-axis. FIG. 5 illustrates the benefits of the instant invention by showing the magnitude of the τ matrix element in response to a change in frequency input. A first frequency was introduced and a second frequency was input and then the system was returned to the first frequency to determine τ matrix response. (i.e. a second frequency representing a command was input to determine system response to the command and how well the sensed noise was reduced) During the first half of the test, shown as line 512, (from time 0–1000 seconds) the τ matrix element experienced drifting. The second part of the experiment, which begins at time equal to 1000 seconds, shown as line 536, illustrates the improved τ matrix response.

The portion of the graph shown as 514 represents the τ matrix element identified during an initial input to an actuator at a first frequency. A second frequency input was introduced at point 518. Point 520 represents a second input of the first frequency. As shown by the portion of the graph 522, the τ matrix element experienced substantial drift and did not return to the magnitude of the first frequency.

At the point 528, the instant invention was implemented to determine τ matrix response to a change in frequency. At point 530, the first frequency was input and at point 531, the second frequency was input. At point 532 the first frequency was input. Portion 534 illustrates that the τ matrix element was steady and did not experience substantial drift utilizing the instant invention.

As shown in FIG. 5, the present invention produces a steady vibratory load that has reduced drifting. The reduced drifting and relatively steady operation produces the desired vibration reduction characteristics to improve the environment of the interior of a vehicle. The first portion of the controller iteration 512 (time 0–1000 seconds) did not utilize the instant invention and experienced significantly greater drifting than the second portion 536 (time 1000–2000 seconds), which utilized the instant invention. Thus, when the τ matrix elements were a function of covariance (R) as described herein there was significantly reduced drift. The improved tracking of τ matrix elements can be utilized to substantially reduce noise in a vehicle.

Figure 6:
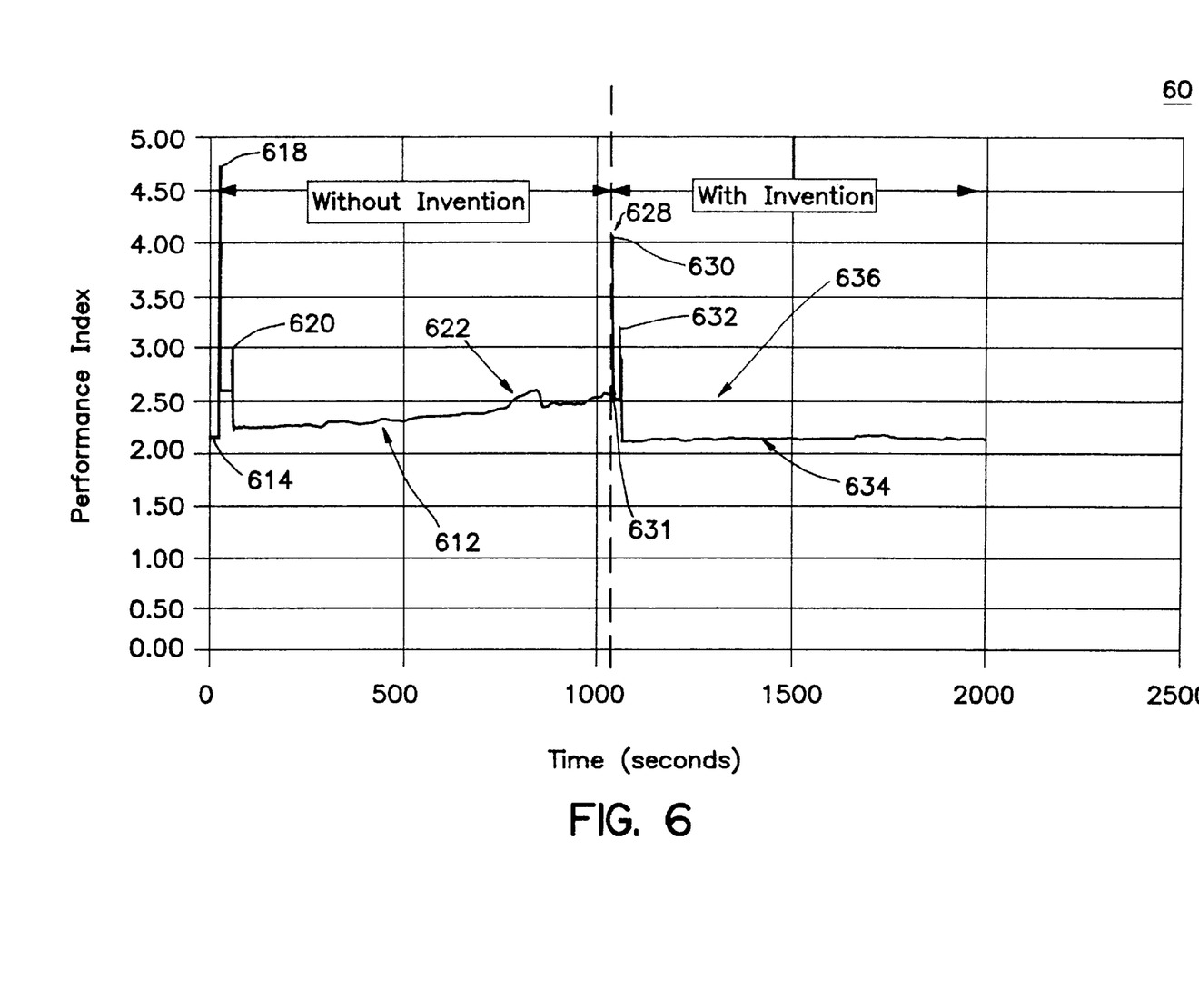
FIG. 6 is a graphical representation of a performance index of the instant invention.

FIG. 6 shows graph 60 that is a plot of performance index data of τ matrix elements acquired on a test vehicle used in the test described in relation to FIG. 5. The performance index was plotted on the Y-axis and time (in seconds) was plotted on the X-axis. The points shown on FIG. 6 correspond to the points of FIG. 5 except a six replaces the five. During the first 1000 seconds of operation, shown as line 612, the test was performed without the instant invention. At time zero, shown by point 614, the performance index was calculated for operation at a first frequency. Point 618 shows the performance index when a second frequency was introduced to the test. Point 620 shows the performance index when the system was operated at the first frequency. As shown by the graph, there was substantial drift in the performance index at point 622.

At point 628 the test was performed using the improved on-line identification of the instant invention. Point 630 represents the performance index during operation at the first frequency. At point 631 the second frequency was input, and at point 632, the first frequency was input. During portion 634, the performance index had very slight drift. The portion 636 (with the invention) illustrates that drift in the performance index was significantly reduced compared to portion 612 (without the invention). As can be seen in FIG. 6, the improved filtering achieved by using a dynamic τ matrix, which is a function of covariance (R), substantially eliminated drift in the performance index.

The instant invention also applies to a flight simulator apparatus. In such an embodiment, simulated vibrations and simulated actuator forces can be generated. The simulated data can be used to generate a data matrix. The results, i e., simulated vehicle motion, can be acquired and stored in a computer memory.

While the invention has been described above with reference to specific embodiments thereof, it is apparent that many changes, modifications and variations can be made herein. Accordingly, it is intended to embrace all such changes, modifications and variations that fall within the spirit and broad scope of the appended claims.

What is claimed is:

1. A system for improving the response of a vehicle to sensed condition comprising:

at least one sensor, mounted in the vehicle, for generating successive first and second ambient vibration signals corresponding to first and second sensed conditions;

at least one actuator, mounted on the vehicle, for generating an actuator force that is applied to the vehicle;

a data module coupled to the sensor and the actuator for storing data, correlating at least one actuator force with at least one sensor response to the force;

a control circuit, including a Kalman filter, for receiving the first and second ambient vibration signals in succession from the sensor and receiving the stored data from the data module, and transmitting a first control signal to an associated actuator corresponding to the first ambient vibration signal;

wherein the control circuit utilizes Kalman filtering and a covariance value, that is a function of an actuator force, to modify data in the data module; and the control circuit transmits a second control signal that is a function of the second ambient vibration signal and the modified data of the data module.

2. The system of claim 1 wherein the at least one actuator generates a vibration field for reducing sensed ambient vibrations in the vehicle in response to the first and second control signals transmitted from the control circuit.

3. The system of claim 1 wherein the ambient vibration signals are stored as a sensor matrix;

the actuator forces are stored as an actuator matrix; and the data in the data module is stored as data matrix.

4. The system of claim 3 wherein the elements of the data matrix are identified by a Kalman equation of the form:

$$\tau_i = [\tau^T_{i-1} + K_i(\Delta Z_i^T - \Delta U_i^T \tau^T_{i-1})]^T$$

where $K_i$ is the Kalman gain matrix, $K_i = P_i \Delta u_i R_i^{-1}$;

$M_i = P_{i-1} + Q_{i-1}$;

$P_i = M_i - M_i \Delta U_i (\Delta U_i^T M_i \Delta U_i + M_i)^{-1} \Delta U_i^T M_i$;

$\Delta U$=change in actuator force;

$\Delta Z$=change in sensor signal;

R=covariance of a noise measurement and is a function of an actuator force;

Q=covariance of a forcing vector;

T=transpose of a matrix; and $\tau$=matrix element.

5. The system of claim 4 wherein the covariance (R) equals:

$$R = (K_{var}/|\Delta U_i|)^N$$

where $K_{var}$=an empirically derived weighing factor;

$\Delta U$=change in actuator force; and

N=a real number greater than 1.

6. The system of claim 1 wherein the data module and the control circuit are stored in a microprocessor.

7. The system of claim 1 wherein the vehicle is a helicopter.

8. A system stored on a computer-readable medium for reducing noise in a vehicle comprising:

sensing ambient vibration in the vehicle;

generating an ambient vibration signal that corresponds to sensed ambient vibration;

processing the ambient vibration signal to produce a control signal, the control signal being a function of a dynamic covariance corresponding to a constant value divided by a change in actuator force raised to an integer power;

outputting the control signal to an actuator; and generating a vibration field for ambient vibration reduction that is a function of the control signal.

9. The system as claimed in claim 8 further comprising:

storing a plurality of ambient vibration signals in a sensor matrix;

storing a plurality of control signals in a data matrix;

storing a plurality of actuator forces in an actuator matrix; and modifying an element of the data matrix as a function of an actuator force.

* * * * *